United States Patent
Dakroub et al.

(10) Patent No.: US 9,070,377 B1
(45) Date of Patent: Jun. 30, 2015

(54) COOLING PERIODS USED DURING THE WRITING OF BIT BOUNDARIES TO A MAGNETIC RECORDING MEDIA

(71) Applicant: Seagate Technology LLC, Cupertino, CA (US)

(72) Inventors: Housan Dakroub, Shakopee, MN (US); Edward Charles Gage, Lakeville, MN (US); Jan-Ulrich Thiele, Sunnyvale, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 15 days.

(21) Appl. No.: 14/104,676

(22) Filed: Dec. 12, 2013

(51) Int. Cl.
*G11B 11/00* (2006.01)
*G11B 5/02* (2006.01)
*G11B 7/1263* (2012.01)
*G11B 5/00* (2006.01)

(52) U.S. Cl.
CPC ............. *G11B 5/02* (2013.01); *G11B 7/1263* (2013.01); *G11B 2005/0021* (2013.01)

(58) Field of Classification Search
CPC ............ G11B 5/02; G11B 2005/001; G11B 2220/25; G11B 5/012; G11B 5/743; G11B 5/746; G11B 2005/0021; G11B 5/09; G11B 20/10009; G11B 27/36; G11B 20/182; G11B 20/10222; G11B 7/1263
USPC .......... 369/13.02, 47.28, 59.19, 13.24, 13.33, 369/13.13, 13.03; 360/59, 31, 46, 53, 65, 360/67, 68, 77.06, 77.12, 45
See application file for complete search history.

(56) References Cited

U.S. PATENT DOCUMENTS

| | | | |
|---|---|---|---|
| 5,995,305 A * | 11/1999 | McNeil et al. | 360/31 |
| 6,157,510 A * | 12/2000 | Schreck et al. | 360/77.06 |
| 6,501,607 B2 * | 12/2002 | Keirn et al. | 360/31 |
| 6,881,497 B2 | 4/2005 | Coffey et al. | |
| 8,315,128 B1 | 11/2012 | Wilson et al. | |
| 8,848,307 B2 * | 9/2014 | Seigler et al. | 360/59 |
| 2012/0275279 A1 | 11/2012 | Wilson et al. | |
| 2013/0201805 A1 | 8/2013 | Seigler et al. | |

* cited by examiner

*Primary Examiner* — Ali Neyzari
(74) *Attorney, Agent, or Firm* — Hollingsworth Davis, LLC (57) ABSTRACT

Polarity transitions of a write signal applied to a write coil correspond to first bit boundaries written to a magnetic recording media. A heat signal is applied to heat the magnetic recording media via a heat source while bits are being written. The heat signal includes negative pulses that de-energize the heat source during cooling periods corresponding to the writing of the first bit boundaries. The negative pulses are offset from the polarity transitions by a predetermined time.

20 Claims, 8 Drawing Sheets

COOLING PERIODS USED DURING THE WRITING OF BIT BOUNDARIES TO A MAGNETIC RECORDING MEDIA

BACKGROUND

A heat-assisted, magnetic recording (HAMR) data storage device uses a high magnetic coercivity medium that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

SUMMARY

The present disclosure is related to causing cooling periods during the writing of bit boundaries to a magnetic recording media. In one embodiment, a method involves determining polarity transitions of a write signal applied to a write coil correspond to first bit boundaries written to a magnetic recording media. A heat signal is applied to heat the magnetic recording media via a heat source while bits are being written. The heat signal includes negative pulses that de-energize the heat source during cooling periods corresponding to the writing of the first bit boundaries. The negative pulses are offset from the polarity transitions by a predetermined time.

In another embodiment, system includes a recording head communicatively coupled to a magnetic recording media. The recording head includes a write coil and is coupled to a heat source. The system includes a transition detector configured to produce negative pulses in response to polarity transitions of a write signal applied to the write coil. The polarity transitions correspond to first bit boundaries written to the magnetic recording media. The system includes a laser driver configure to apply a heat signal to the heat source while bits are being written and a delay element that offsets the negative pulses from the polarity transitions by a predetermined time. The system further includes a combinatorial circuit that applies the negative pulses to the heat signal to de-energize the heat source during cooling periods corresponding to the writing of the first bit boundaries These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The figures are not necessarily to scale.

DETAILED DESCRIPTION

The present disclosure is generally related to an apparatus (e.g., a HAMR storage device) having a magnetic recording media, and a read/write head communicatively coupled to the magnetic recording media. The recording head includes a write coil and a heat source such as a laser. A preamplifier is coupled to the write head and configured to apply a write signal to the write coil with polarity transitions. The polarity transitions corresponding to boundaries of some (but not necessarily all) bits written to the magnetic recording media. The heat source is energized while the bits are being written and de-energized during a cooling period corresponding to the polarity transitions. The negative pulses are offset from the polarity transitions by a predetermined time. Generally, this provides sharper bit transitions and reduces heat at the recording head.

A HAMR read/write element, sometimes referred to as a slider, recording head, or read/write head, includes magnetic read and write transducers similar to those on conventional hard drives. For example, data may be read by a magnetoresistive sensor that detects magnetic fluctuations of a magnetic medium as it moves underneath the sensor. Data may be written to the magnetic medium by a write coil that is magnetically coupled to a write pole. The write pole changes magnetic orientation in regions of the media as it moves underneath the write pole. A HAMR device will also generally utilize a source of energy/heat, such as a laser diode, to heat the media while it is being written to by the write pole. An optical delivery path may be integrated into the HAMR slider to deliver the energy to the surface of the media.

The optical delivery path of a HAMR slider may include a near-field transducer (NFT) proximate a media-facing surface (e.g., air-bearing surface, contact surface). The NFT shapes and transmits the energy to a small region on the recording medium. The NFT is sometimes referred to as an optical antenna, surface plasmon resonator, etc., and may include a plasmonic metal such as gold, silver, copper, aluminum, etc., and alloys thereof. The NFT for a HAMR device creates a localized region of high power density in the media through an electromagnetic interaction. This results in a high temperature rise in a small region on the media, with the region exceeding the Curie temperature having dimensions less than 100 nm. This also results in high temperature rise in the slider near the NFT due to optical losses in the delivery path.

Figure 1:
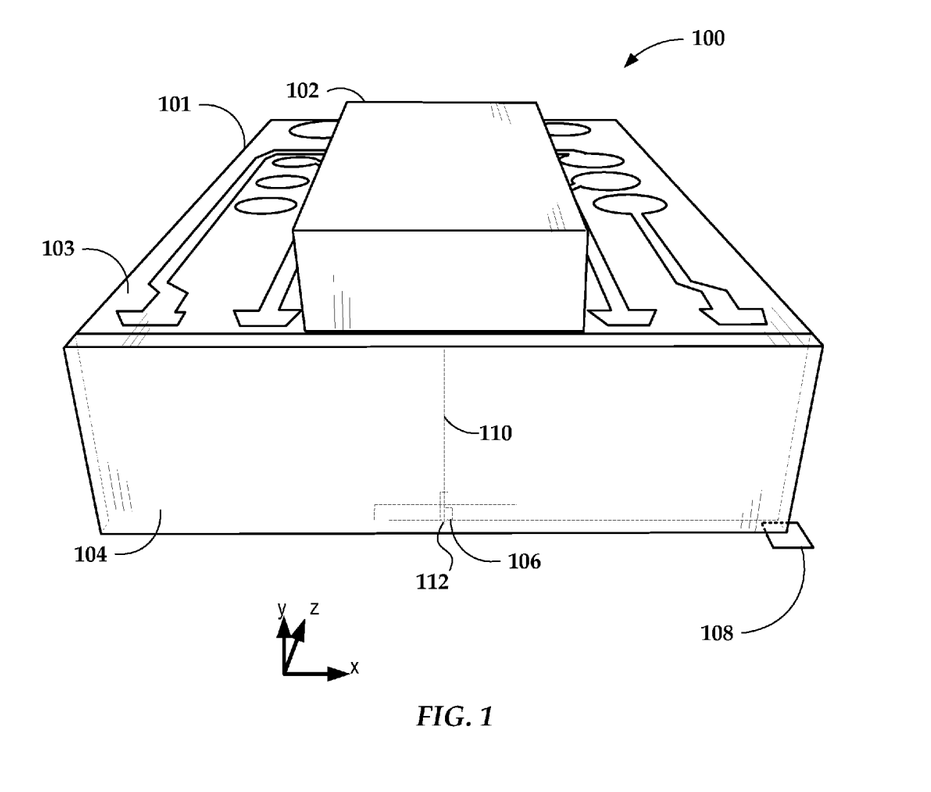
FIG. 1 is a perspective view of a slider assembly according to an example embodiment.

In reference to FIG. 1, a perspective view shows HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers energy to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of one edge. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the slider assembly 100 may use any type of light delivery configuration. For example, a laser may be mounted on the trailing edge surface 104 instead of the top surface 103. In another configuration known as free-space light delivery, a laser may be mounted external to the slider assembly 100, and be coupled to the slider by way of optic fiber and/or waveguide. An input surface of the slider body 101 may include a grating or other coupling feature to receive light from the laser via the optic fiber and/or waveguide. Similarly, other sources of heat may be used besides a laser, e.g., an energy emitter with wavelengths above or below the visible light spectrum.

Figure 2:
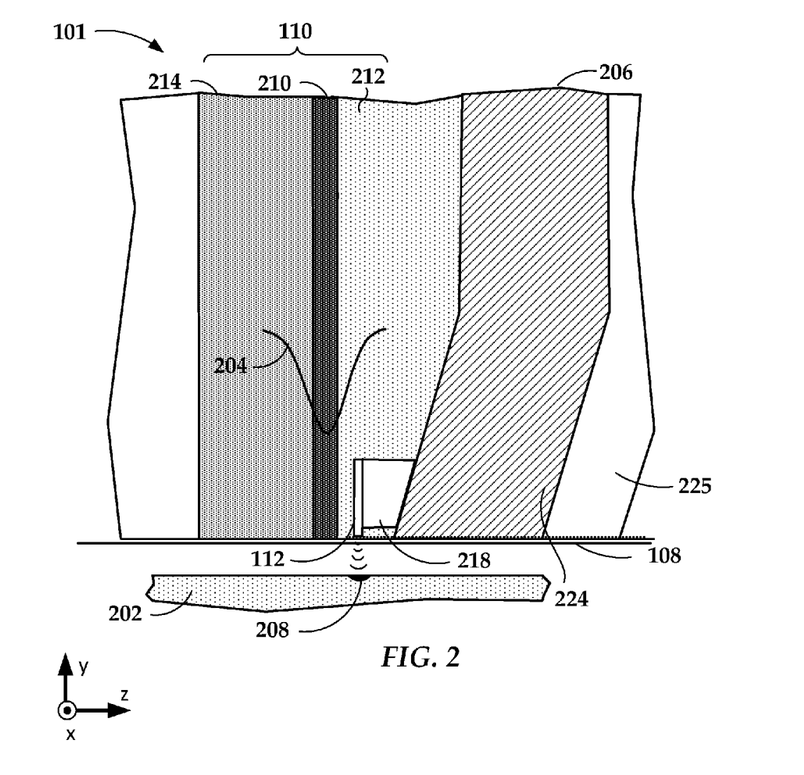
FIG. 2 is a cross sectional view of a slider assembly according to an example embodiment.

In FIG. 2, a cross-sectional view illustrates portions of the slider body 101 near the NFT 112 according to an example embodiment. In this view, the NFT 112 is shown proximate to a surface of magnetic media 202, e.g., a magnetic disk. The waveguide 110 delivers electromagnetic energy 204 to the NFT 112, which directs the energy to create a small hotspot 208 on the media 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

The waveguide 110 includes a layer of core material 210 surrounding by cladding layers 212, 214. The core layer 210 and cladding layers 212, 214 may be made from dielectric materials such as $Al_2O_3$, SiOxNy, $SiO_2$, $Ta_2O_5$, $TiO_2$ or $Nb_2O_5$, etc. Generally, the dielectric materials are selected so that the refractive index of the core layer 210 is higher than refractive indices of the cladding layers 212, 214. This arrangement of materials facilitates efficient propagation of light through the waveguide 110.

The energy 204 applied to the NFT 112 creates the hotspot 208. The NFT 112 may be formed to include a peg, pin, bar, or other protrusion having relatively small dimensions in order to keep the generated plasmonic field small. The NFT 112 is formed from a plasmonic metal (e.g., Au, Ag, Cu, Al, and alloys thereof) that exhibits surface plasmon resonance when excited by the energy. A heat sink 218 may be formed proximate to (or integral with) the NFT 112 in order to draw heat away from the NFT 112.

The temperature at the hotspot 208 exceeds the Curie temperature of the magnetic media 202. This lowers the local magnetic coercivity such that the write pole 224 to change a magnetic orientation of the hotspot 208. Cooler regions outside the hotspot do not change magnetic orientation because coercivity of these regions is higher. In some designs, the laser (or other energy source) is continuously activated while writing. In such a case the hotspot 208 moves along the surface of the media 202, and is affected by fields from the write pole at positive and negative field orientations, as well as during transitions therebetween.

A continuous-write system can utilize relatively simple laser control circuitry because the laser is kept on at times while writing. However, this can generate significant heat in the read/write heads, which can impact reliability. An alternate approach involves pulsing the laser so that it is only activated when each bit is written, and is turned off between bits. For example, the write channel (or other circuitry) may be adapted to send a data signal to the laser driver as well as to the write coil. This may generally require a different signal than what is sent to the write coil, because the laser is turned off and on for each bit, whereas the write coil may have the same signal level/polarity applied for multiple bits.

Embodiments described herein utilize an alternate approach where the laser is turned off only during polarity transitions of the write pole. This can provide some thermal benefits to the read-write head compared to a continuous-write arrangement. Further, an arrangement where the laser turns off during write transitions can be simpler to implement than a pulsed write arrangement, as the pulsing of the laser can be synchronized with a write signal applied to the write coil. Having the laser turned off during magnetic transitions can lead to sharp thermal gradients between bit boundaries. Sharp thermal gradients result in sharp recorded transitions, which enables higher areal densities.

Figure 3:
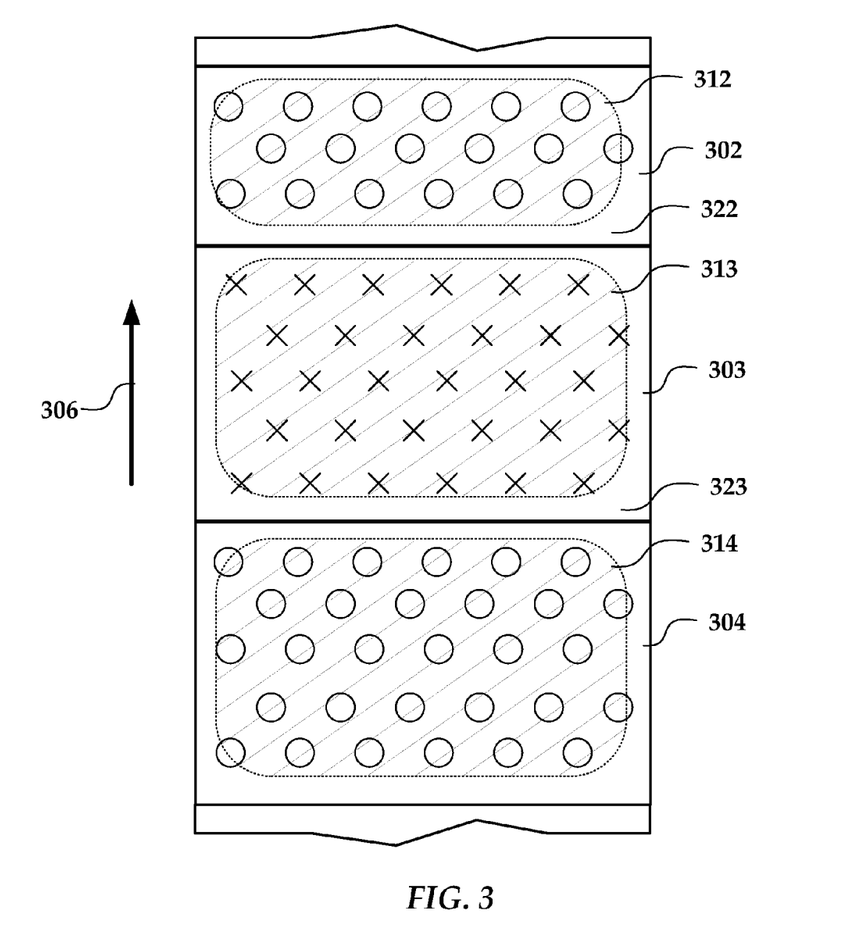
FIG. 3 is a block diagram showing data regions on a track according to an example embodiment.

In FIG. 3, a block diagram illustrates how example embodiments may produce sharper recorded transitions between bits. Regions 302-304 represent data regions on a track recorded onto a HAMR media. The media moves relative to a recording head in a direction represented by arrow 306. The regions 302-304 may represent multiple bits. For example, regions 303-304 may store two bits of the same value, and region 302 may store a single bit.

As represented by circles or crosses, regions 302 and 304 have one magnetic orientation, and region 303 has another magnetic orientation. As such, the borders between adjacent regions 302-304 represent magnetic transitions. The magnetic transitions serve as bit boundaries between adjacent bits that have different values. As noted above, some regions 302-304 may store multiple bits of the same value, and so second bit transitions may be internal to regions 302-304, but do not involve magnetic transitions.

The shaded areas 312-314 within respective regions 302-304 are directly heated by a heat source during recording. Gaps 322, 323 between the regions 312-314 represent times when the heat source is switched off during recording. The gaps 322, 323 may still be heated somewhat due to conductive heat transfer from neighboring heated areas 312-314, but that gaps 322, 323 may remain significantly cool such that a sharp thermal gradient exists between gaps 322, 323 and respective neighboring regions 312-314. The gaps 322, 323 also generally correspond to first bit boundaries, e.g., those bit boundaries that involve a magnetic transition.

The write coil will be in transition between polarities while passing over gap regions 322, 323, and so the magnetic state of the gap regions 322, 323 would tend to gradually transition from one magnetic orientation to the other if the gap regions 322, 323 were heated while recording. Because the laser is switched off while the write coil passes over gap regions 322, 323, the media will be cooling in the gap thereby providing a larger effective write field gradient and therefore a sharp transition between magnetic orientation of regions 312, 314 will be recorded. This will provide a signal with more distinct transitions when reading back bit boundaries, and this can help reduce bit error rate and facilitate more closely packing bits within the regions 302-304.

Figure 4:
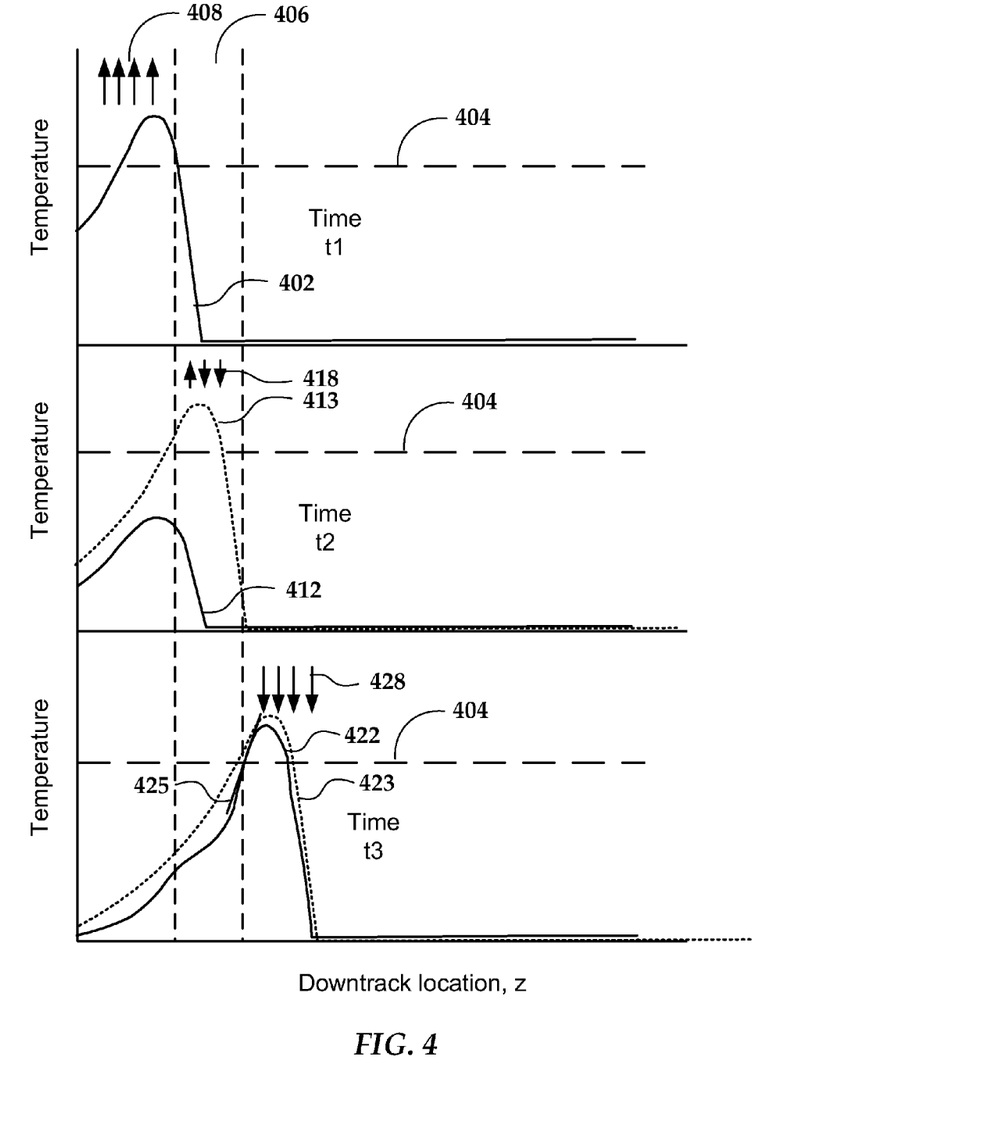
FIG. 4 is a graph of thermal profiles near a bit transition region according to an example embodiment.

In FIG. 4, a graph shows an example of how momentarily switching off a heat source can lead to sharper thermal gradients within a bit transition region 406 according to an example embodiment. Curve 402 represents downtrack temperatures at a media surface while it is being heated by a read/write head during a first time period t1. Line 404 represents the Curie temperature of the media, such that above that temperature, the media will change orientation responsive to an applied magnetic field, shown as arrows 408 at the first time period t1.

At time t2, the write coil is transitioning polarity, and so the applied magnetic field as represented by arrows 418 may be weaker and vary depending on location. Dashed curve 413 represents a temperature profile if the heat source was left on when writing to the bit transition region 406, and curve 412 represents a temperature profile if the heat source was turned off while writing to this regions 406. Because the temperature of curve 412 is below the Curie temperature in bit transition region 406, the media will not be affected by the weak/variable field 418

At time t3, the laser has been turned on, and the write field at this time, represented by arrows 428, has fully transitioned to the other direction. The curve 422 represents temperature at the media now that the heat source has been turned back on. Dashed curve 423 represents a temperature profile if the laser were left on. Note that a temperature gradient 425 for curve 422 is sharper than for curve 423 because the temperature within bit transition region 406 is lower for curve 422 due to the heat source being turned off. As such, turning off the heat source helps make the trailing edge of the heat profile is sharper than if the heat source were left on during the bit transition 406.

Figure 5:
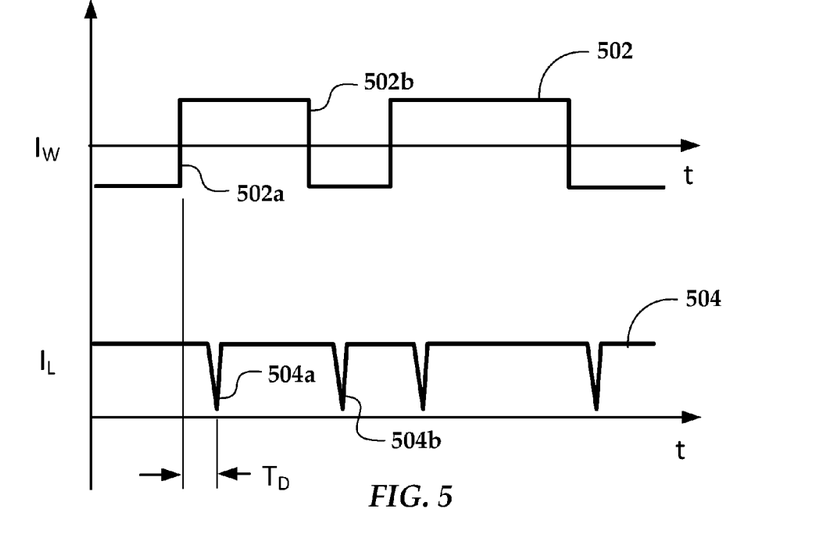
FIGS. 5 and 6 are signal timing diagrams showing signals used to drive a write coil and laser according to example embodiments.

In reference now to FIG. 5, a signal timing diagram shows signals used to drive a write coil and laser according to an example embodiment. Trace 502 represents current applied to a write coil ($I_W$) and trace 504 represents a heat signal, e.g., current applied to a laser ($I_L$). Heat signal 504 may generally be a constant/fixed current signal, with negative impulses (such as negative pulses 504a-b) inserted to help define sharp transitions. The negative pulses 504a-b are synchronous with the transitions of the write coil signal 502, as represented by positive transition 502a and negative transition 502b. The negative pulses 504a-b reduce the heat signal 504 to a level that at least de-energizes the heat source (e.g., laser) during a cooling period corresponding to the writing of first bit boundaries via write signal 502.

The first bit boundaries are written via transitions 502a-b of write signal 502, and are boundaries of adjacent bits that have different polarity. This is in contrast to second bit boundaries of same-polarity bits that may occur between transitions 502a-b. The cooling period may be about 1 to 10 times of a rise time or fall time of the transitions 502a-b, and so the pulse width of negative pulses 504a-b may be set accordingly. The lowest signal level of the negative pulses 504a-b may be negative, zero, or positive, e.g., just below an activation current that energizes the laser diode.

The negative pulses 504a-b are delayed from the transitions 502a-b by a predetermined delay time $T_D$. The write channel preamp (or other system component, such as a laser driver) can set this delay. Generally, the value of $T_D$ may depend on a downtrack distance between the laser and write coil, thermal properties of the media and/or head, signal delays on laser and/or write coil lines, etc. The negative pulses 504a-b will "freeze" sharper magnetic transition between adjacent bits having different values that are recorded on the magnetic medium. The negative pulses will also somewhat reduce heating of the read/write head, improving reliability.

For even greater improvements in reliability, the laser (or other energy source) may be driven with a signal that has a lower duty cycle, thereby further reducing heating of the read/write head. This may involve driving the laser with more complex waveform shapes, although ones that can still be triggered and delayed based on polarity transitions of a write coil signal. An example embodiment of a lower-duty cycle waveform is shown in the signal timing diagram of FIG. 6.

Figure 6:
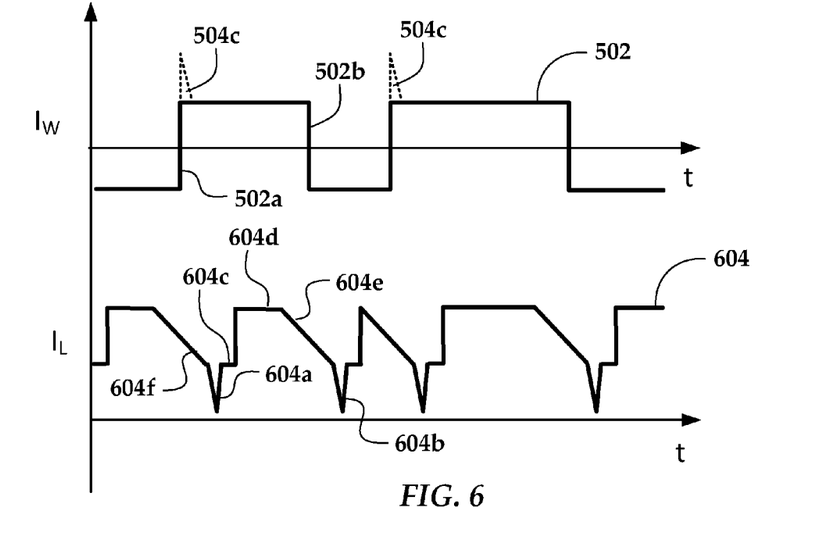

For purposes of comparison, the write coil current ($I_W$) of trace 502 is the same as that shown in FIG. 5. Heat signal 604 represents current applied to a laser ($I_L$) or other heat source, and is resembles a pulsed current signal, although one that is synchronous with transitions 502a, 502b of trace 502. As with the previous example, negative impulses 604a, 604b are inserted to help define sharp thermal gradients and sharp magnetic transitions on the media. In addition, a first dwell region, such as dwell region 604c, follows negative pulse 604a. The heat signal 604 is at an intermediary signal level during a dwell time of the dwell region 604c. Thereafter, the signal quickly rises to full power at a peak power region 604d. The duration of the peak power region 604d may vary depending on the spacing of adjacent negative pulses, e.g., time duration between pulses 604a-b. The peak power region 604d is followed by a gradual negative slope region 604e, which immediately precedes the next negative pulse 604b. Another negative slope region 604f is shown preceding negative pulse 604a.

The magnetic writer pulse 502 can also be shaped to facilitate sharp magnetic transitions. For example, an overshoot 502c (see FIG. 6) can be inserted at the beginning of each magnetic writer current transition. The transition point 502b can be shifted in a predetermined fashion depending on the write pattern to compensate for intersymbol interference. The laser amplitude can be adjusted through the write process to compensate for heating in the head causing thermal protrusion and decreasing laser power.

It will be understood that a reduced-duty-cycle waveform such as heat signal 604 may be obtained in a number of ways. For example, negative slope region 604f, negative pulse 604a, and dwell region 604c may be formed by applying a negative composite pulse on a constant current signal applied to the laser. In such a case, the beginning of the composite pulse would be the beginning of sloped region 604f, and the composite pulse could be delayed from the transitions 502a, 502b by an appropriate delay time $T_{D1}$ (not shown).

Many different variations of a complex pulse may be used that differ in some way from illustrated trace 604. For example, the dwell region 604c or the sloped region 604e may be optional. In another example, a duration of the peak region 604d may be set to a minimum amount, and the rate of change of the sloped regions 604e-f and/or dwell regions 604c may be adjusted if needed to account for variations of time between negative pulses 604a-b. The dwell region 604c may include, instead of a flat region of intermediate signal level after the negative pulse 604a, a gradual slope until the peak power of region 604d is reached, and various parts of the signal may include overshoot or undershoot depending on the desired thermal characteristics.

Figure 7:
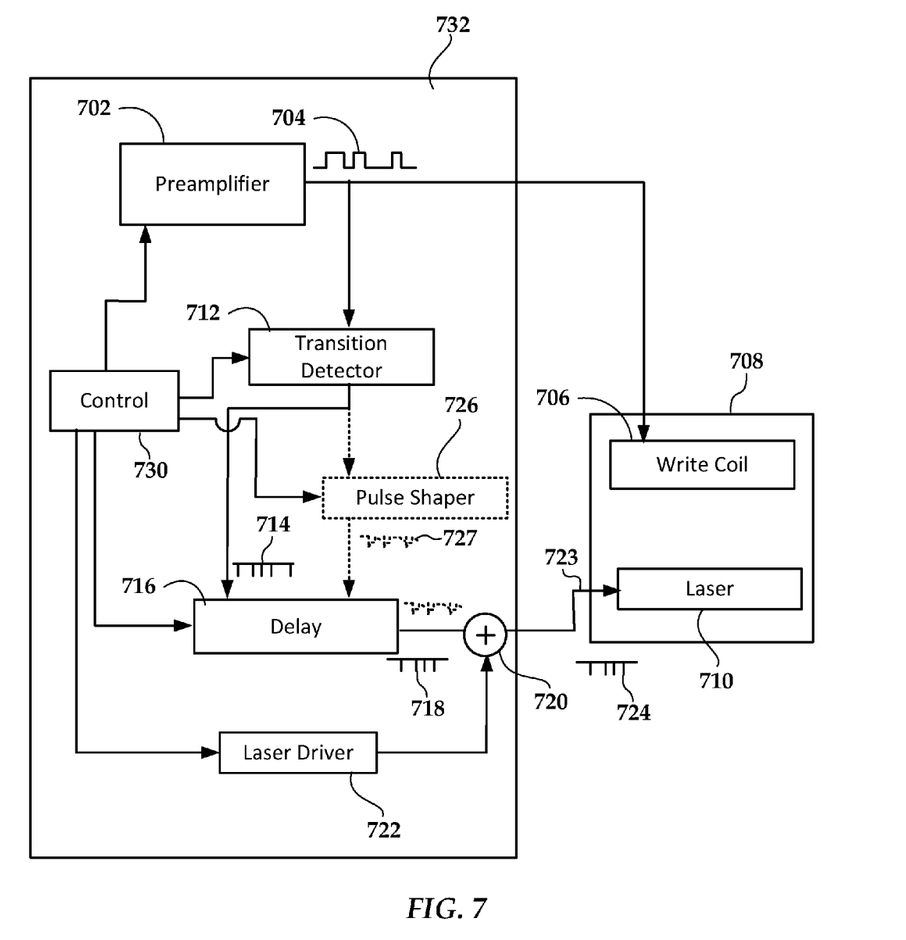
FIG. 7 is a block diagram of a controller and recording head according to an example embodiment.

In reference now to FIG. 7, a block diagram illustrates functional blocks of a storage device according to an example embodiment. Generally, a preamplifier 702 provides a write signal 704 to at least one write coil 706. The write coil 706 is shown here mounted in a recording head 708, which also includes (or is coupled to) a laser 710 or other source of energy/heat. The write signal 704 is also coupled to a transition detector 712 that produces negative pulses 714 for each negative-to-positive and positive-to-negative transition of the write signal 704.

The negative pulses 714 are sent to a delay element 716, which produces a delayed negative pulse signal 718 that is offset from the negative pulses 714 by a predetermined time. The delayed pulse signal 718 is combined at via a combinatorial circuit 720 with output of laser driver 722 to form heat signal 724. The heat signal 724 is sent to laser 710 via signal line 723. Generally, the laser driver 722 may output a relatively fixed current that is set based on other system requirements. The delayed negative pulsed signal 718 causes the heat signal 724 to be momentarily de-energized during magnetic transitions of the write coil 706, which correspond to first bit boundaries written to a recording media (not shown).

In an alternate arrangement, the negative pulses 714 output from the transition detector 712 may be sent to a pulse shaper 726, which provides a more complex negative signal 727 that is sent to the delay element 716 and combined with output of the laser driver 722. This may reduce a duty cycle of a signal sent the laser 710, and result in less heating of the read/write head during write operations.

The values applied via preamplifier 702, transition detector 712, pulse shaper 726, delay element 716, and laser driver 722 may be adjustable via control element 730. These adjustments may be statically set during manufacture or use, and/or may be dynamically controlled via system feedback. For example, total laser power may be adjusted via input to laser driver 722, and this may or may not require adjusting peak output (or other parameters) of transition detector 712 and/or pulse shaper 726.

Generally, the preamplifier 702, transition detector 712, pulse shaper 726, delay element 716, laser driver 722, and control element 730 may be part of a controller 732 that generally performs functions of a data storage device. The controller 732 may include logic circuits, microprocessors, analog conditioning circuitry, power supply and condition circuitry, servo/motor controllers, and other circuits that control operation of the storage device. The controller 732 may be configurable via software or firmware to perform at least some functions described herein.

It will be understood that many other alternate arrangements and functional components may be used to obtain a similar result shown in FIG. 7. For example, the laser driver 722 may be configured to directly produce either simple or complex laser waveform outputs, either via negative pulses 714 output from transition detector 712 or directly from output signal 704 of the preamplifier 702. Generally, such solutions do not require additional interconnects to the recording head 708, nor do such solutions require additional electronics in the write channel.

In another alternate configuration, negative laser pulses (e.g., pulses 714) can be generated independently by the write channel, e.g., via controller 730. Every time the controller 730 issues a negative pulse 714, the preamplifier 702 toggles write data.

This removes the need to provide separate write data input signals to the preamplifier. The write channel is only required to send a 1T signal that marks the position of negative going impulses. Since there is no requirement for magnetic write current input signals, there is also no requirement for time delays between the magnetic write input signals and laser diode input signals. Note that position of magnetic write data current transitions 704 may vary with respect to the input laser impulse signals 724, but this time-shifting can be handled by the preamplifier 702.

The storage device shown in FIG. 7 may be used with recording media with heat transfer characteristics that are optimized for use with the pulsed laser recording described herein. An example embodiment of a recording medium 800 is shown in the block diagram of FIG. 8. Generally, the recording medium is built on a substrate 802 (e.g., glass), where a soft under layer (SUL) 804 is deposited. The SUL 804 may also act as a heat sink. An interlayer 806 controls magnetic coupling between the recording layer 808 and SUL 804. Generally, the recording layer 808 includes high-coercivity material that is magnetically recorded when heated past its Curie temperature. A lubricant/overcoat layer 810 protects the recording layer 808 and acts as a mechanical interface between the medium 800 and read/write head.

Figure 8:
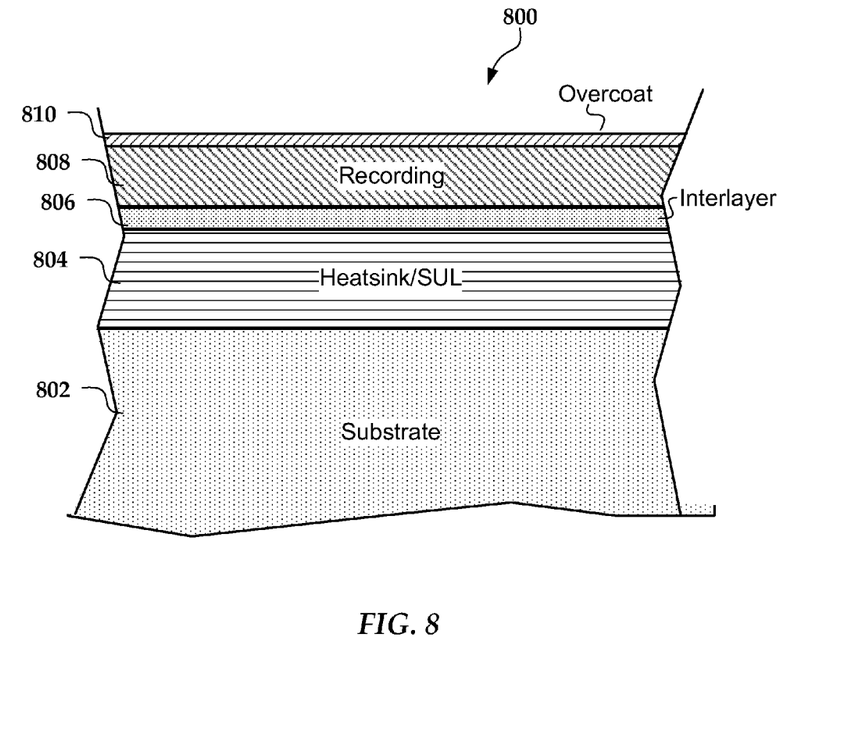
FIG. 8 is a block diagram of a recording medium according to an example embodiment.

The recording medium 800 may be adapted to optimize recording using read/write head embodiments described above. For example, the recording medium 800 may be designed to cool quickly to maximize the effective write field gradient. This can be accomplished by adjusting materials and geometry of the heat sink 804 and interlayers 806. In another example, the media cooling time constant may be to be adjusted to maximize fast-freeze performance. For example, the medium 800 may be designed with a thermal time constant that corresponds to the cooling period when the laser is momentarily shut off by negative pulses. So if negative pulse width is in the range of 0.1 to 1 nsec, the thermal time constant may be matched, e.g., nearly the same or on the same order, e.g., between 0.10 times and 10 times the pulse width.

The medium 800 may be designed with a strong alignment of the resulting magnetization upon cooling. This can be done by using thermal spring media that has been designed to take advantage of the rapid cooling. Thermal spring magnetic recording media includes first and second stacks in a laminated structure. The stacks provide two exchange-coupled ferromagnetic layers having different Curie temperatures. The first stack has a high magneto-crystalline anisotropy and a low Curie temperature (e.g., granular $L1_0$ phase of FePt or CoPt alloys. The second stack has a relatively low magneto-crystalline anisotropy, a high saturation magnetization and a high Curie temperature (e.g., CoPt or CoPd alloys).

Other exchange coupled media designs such as exchange coupled composite (ECC) media may also be used. For example, ECC media may be formed by combining perpendicular hard magnetic alloy films (e.g., FePt) with perpendicular multilayers which are magnetically softer (e.g., Co or Pt). The switching field of the hard layer can be efficiently altered by modifying the material properties of the soft layer.

Figure 9:
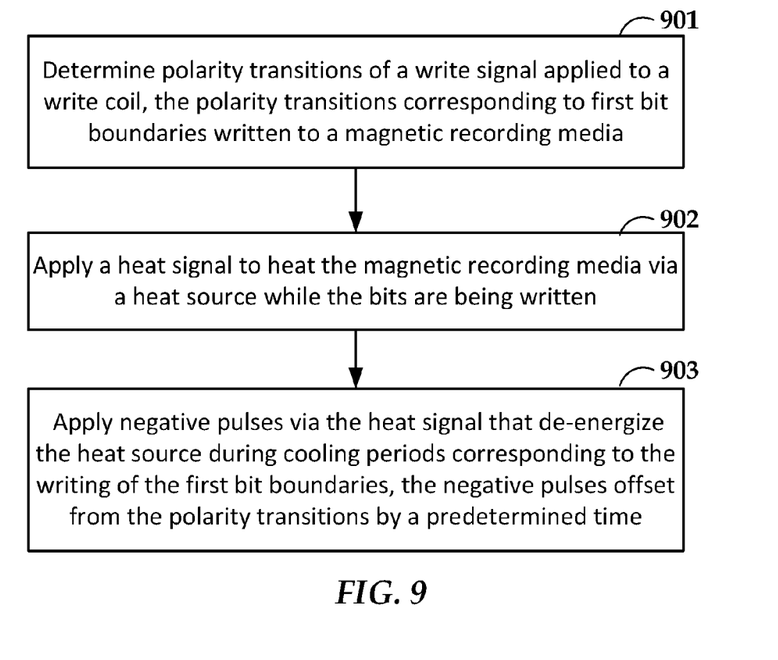
FIG. 9 is a flowchart of a method according to an example embodiment.

In reference now to FIG. 9, a flowchart illustrates a method according to an example embodiment. The method involves determining 901 polarity transitions of a write signal applied to a write coil. The polarity transitions correspond to first bit boundaries written to a magnetic recording media. A heat signal is applied 902 to heat the magnetic recording media via a heat source while the bits are being written. This heat signal may be a constant current/voltage source. A negative pulse 903 is applied via the heat signal that de-energizes the heat source during a cooling period corresponding to the writing of the first bit boundaries. The negative pulse is offset from the polarity transitions by a predetermined time.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
   determining polarity transitions of a write signal applied to a write coil, the polarity transitions corresponding to first bit boundaries written to a magnetic recording media; and
   applying a heat signal to heat the magnetic recording media via a heat source while bits are being written, the heat signal comprising negative pulses that de-energize the heat source during cooling periods corresponding to the writing of the first bit boundaries, the negative pulses offset from the polarity transitions by a predetermined time.

2. The method of claim 1, wherein the heat source remains energized when writing second bit boundaries via the write signal, wherein a polarity of the write signal is not changed when writing the second bit boundaries.

3. The method of claim 1, wherein the magnetic recording media comprises a thermal time constant that corresponds to the cooling periods.

4. The method of claim 1, wherein cooling of the magnetic recording media during the cooling periods results in sharper magnetic transitions at the first bit boundaries than if the heat source was energized during the cooling periods.

5. The method of claim 1, wherein cooling of the magnetic recording media during the cooling periods results in sharper thermal gradients at the first bit boundaries than if the heat source was energized during the cooling periods.

6. The method of claim 1, wherein the cooling periods are no larger than ten times a rise time or fall time of the polarity transitions.

7. The method of claim 1, wherein the heat signal comprises slopes between the negative pulses, the slopes reducing a duty cycle of the heat source.

8. The method of claim 1, wherein the heat signal comprises dwell times between the negative pulses that reduce a duty cycle of the heat source, wherein the heat signal is at an intermediate level during the dwell times.

9. An apparatus comprising:
   a controller capable of being coupled to a write coil of a recording head and a heat source that applies heat to a magnetic recording media via the recording head, the controller comprising:
      a preamplifier configured to apply a write signal with polarity transitions to the write coil, the polarity transitions corresponding to first bit boundaries written to the magnetic recording media; and
      a signal line configured to apply a heat signal to the heat source while bits are being written, the heat signal comprising negative pulses that de-energize the heat source during cooling periods corresponding to the writing of the first bit boundaries, the negative pulses offset from the polarity transitions by a predetermined time.

10. The apparatus of claim 9, wherein the heat source remains energized when writing second bit boundaries via the write signal, wherein a polarity of the write signal is not changed when writing the second bit boundaries.

11. The apparatus of claim 9, wherein the magnetic recording media comprises a thermal time constant that corresponds to the cooling periods.

12. The apparatus of claim 9, wherein cooling of the magnetic recording media during the cooling periods results in sharper magnetic transitions at the first bit boundaries than if the heat source was energized during the cooling periods.

13. The apparatus of claim 9, wherein cooling of the magnetic recording media during the cooling periods results in sharper thermal gradients at the first bit boundaries than if the heat source was energized during the cooling periods.

14. The apparatus of claim 9, wherein the heat signal comprises slopes between the negative pulses, the slopes reducing a duty cycle of the heat source.

15. The apparatus of claim 9, wherein the heat signal comprises dwell times between the negative pulses that reduce a duty cycle of the heat source, wherein the heat signal is at an intermediate level during the dwell times.

16. A system comprising:
   a recording head communicatively coupled to a magnetic recording media, the recording head comprising a write coil and coupled to a heat source; and
   a transition detector configured to produce negative pulses in response to polarity transitions of a write signal applied to the write coil, the polarity transitions corresponding to first bit boundaries written to the magnetic recording media; and
   a laser driver configure to apply a heat signal to the heat source while bits are being written;
   a delay element that offsets the negative pulses from the polarity transitions by a predetermined time; and
   a combinatorial circuit that applies the negative pulses to the heat signal to de-energize the heat source during cooling periods corresponding to the writing of the first bit boundaries.

17. The system of claim 16, further comprising a shaper that adds slopes to the heat signal between the negative pulses, the slopes reducing a duty cycle of the heat source.

18. The system of claim 16, further comprising a shaper that adds dwell times to the heat signal between the negative pulses, the dwell times reducing a duty cycle of the heat source, wherein the heat signal is at an intermediate level during the dwell times.

19. The system of claim 16, wherein the magnetic recording medium has a thermal time constant that is matched to a pulse width of the negative pulses.

20. The system of claim 16, wherein the magnetic recording medium comprises a thermal spring recording medium.

* * * * *